United States Patent [19]

Howie, Jr.

[11] 4,351,886

[45] Sep. 28, 1982

[54] METHOD OF FORMING A LAMINATED STRUCTURAL MEMBER AND MEMBER FORMED THEREBY

[75] Inventor: Robert K. Howie, Jr., Decatur, Ill.

[73] Assignee: The Grigoleit Company, Decatur, Ill.

[21] Appl. No.: 167,420

[22] Filed: Jul. 11, 1980

[51] Int. Cl.³ .................... B65D 25/28; A47B 95/02
[52] U.S. Cl. .................... 428/591; 428/594; 428/603; 16/111 R; 29/509
[58] Field of Search ............ 428/591, 594, 603; 16/111; 29/509

[56] References Cited

U.S. PATENT DOCUMENTS

| | | | |
|---|---|---|---|
| 2,187,924 | 1/1940 | Winkleman | 428/591 |
| 2,677,852 | 5/1954 | Jain et al. | 16/111 R |
| 2,731,662 | 1/1956 | Mills | 16/111 R |

*Primary Examiner*—Brooks H. Hunt
*Attorney, Agent, or Firm*—Kinzer, Plyer, Dorn & McEachran

[57] ABSTRACT

A method of forming a laminated structural member and the structural member formed thereby. The method includes the steps of securing a first sheet of metal and a superimposed second sheet of metal to each other along areas on opposite edges of the sheets while leaving an area in between the secured areas unfastened. At least one bend is formed in the unfastened area of the sheets along an axis parallel to the secured edges. The concave side of the bend is located on the second sheet side of the laminate in order to stretch the first sheet through a greater distance than the second sheet is stretched by the formation of the bend. The first sheet of metal is selected for appearance characteristics and/or finish accepting characteristics which are more desirable in the completed laminate than those of the second sheet of metal. The first sheet of metal is secured to the second sheet of metal either by forming superimposed loops or curls in the edges of the first and the second sheets of metal or by lancing the first sheet of metal to the second sheet of metal along opposite edges of the sheets. Mounting elements or other structural elements may be formed in the second sheet of metal or it may be structurally deformed before it is secured to the first sheet of metal.

13 Claims, 12 Drawing Figures

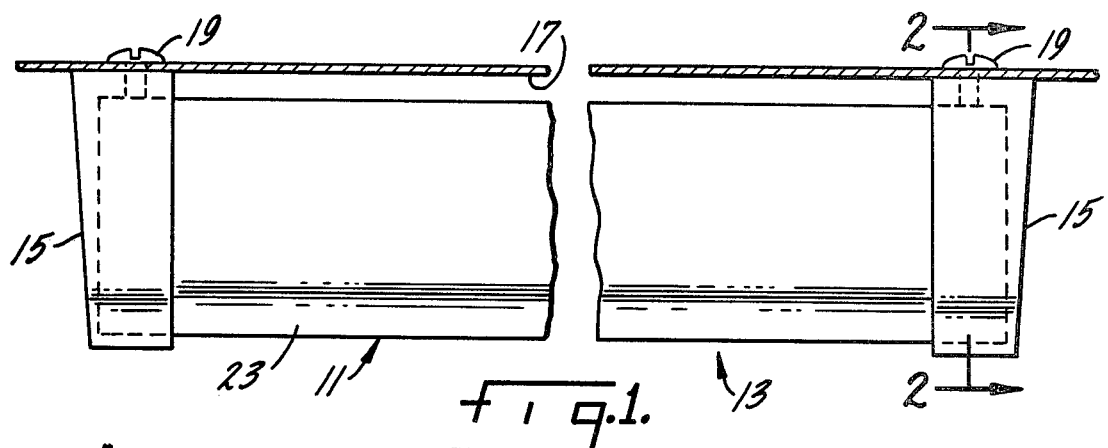
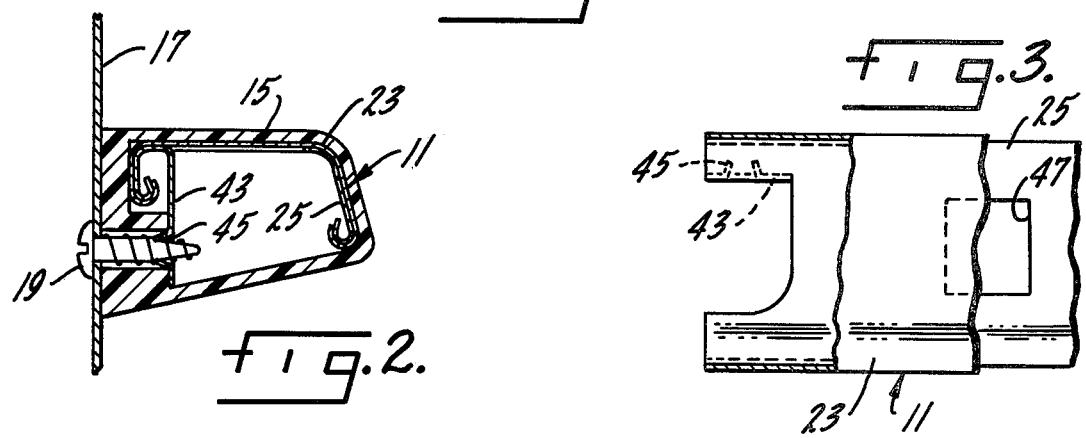
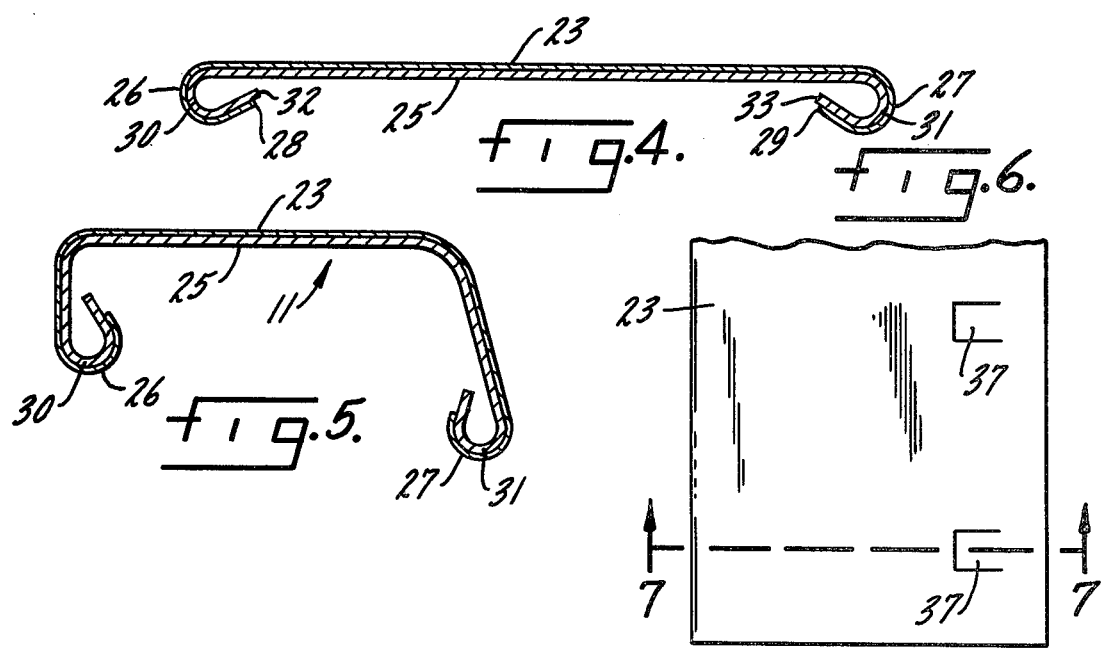

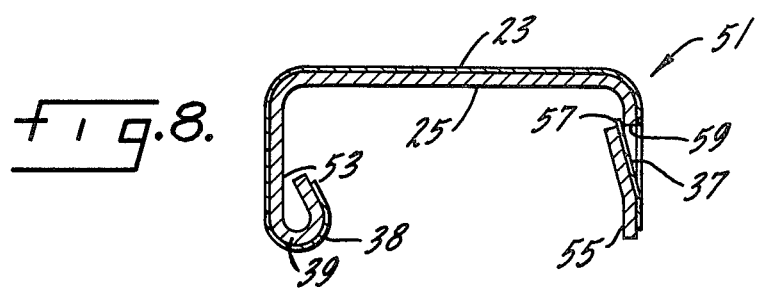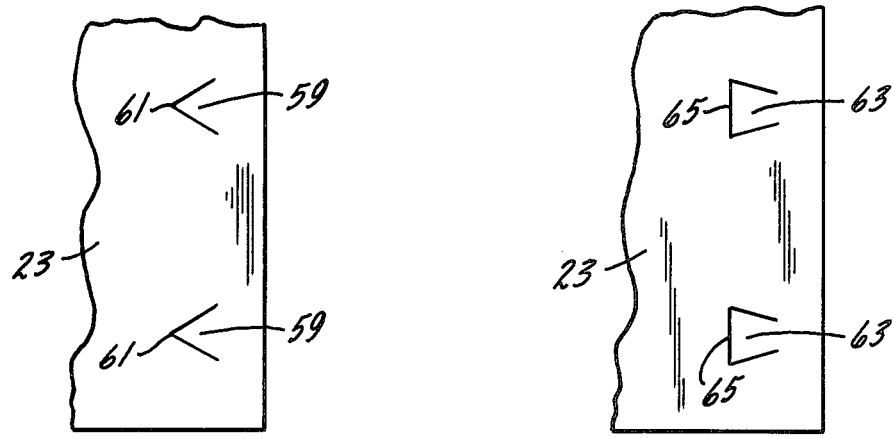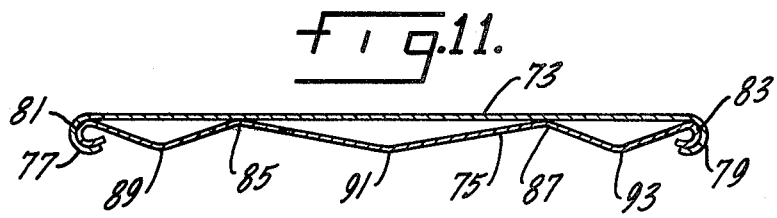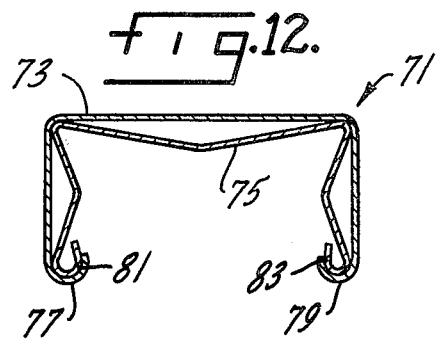

METHOD OF FORMING A LAMINATED STRUCTURAL MEMBER AND MEMBER FORMED THEREBY

SUMMARY OF THE INVENTION

This invention is concerned with a laminated structural member and a method of forming it. It is particularly concerned with a structural member having an outer facing or surface which is either more attractive or more readily accepts an attractive finish than does the core of the laminate.

An object of this invention is a laminated structural member having an outer facing which is attached to and is stretched over a core.

Another object of this invention is a laminated structural member in which the outer facing conceals structural elements attached to or built into the core.

Another object is a laminated structural member having an outer facing of a relatively thin light weight metal and a core of a heavier stronger metal.

Other objects may be found in the following specification, claims and drawings.

BRIEF DESCRIPTION OF THE DRAWINGS

The invention is illustrated more or less diagrammatically in the following drawings wherein:

FIG. 1 is a top plan view of a laminated structural member of this invention incorporated in a stove handle with the structural member shown broken intermediate its ends;

FIG. 2 is a cross sectional view taken along line 2—2 of FIG. 1;

FIG. 3 is a top plan view of one end of the structural member of FIG. 1 with parts omitted and others broken away for clarity of illustration;

FIG. 4 is a cross sectional view showing the first step of one method of forming a laminated structural member of this invention;

FIG. 5 is a cross sectional view showing a second step of one method of forming the laminated structural member of this invention;

FIG. 6 is a partial top plan view of a modified laminate for a structural member to be constructed in accordance with the teachings of this invention;

FIG. 7 is a cross sectional view taken along line 7—7 of FIG. 6;

FIG. 8 is a cross sectional view showing the completed structural member of FIG. 6;

FIG. 9 is a partial plan view of a laminate showing a modified form of lanced anchoring tabs;

FIG. 10 is a view similar to FIG. 9 showing yet another modified form of lanced anchoring tabs;

FIG. 11 is a cross sectional view showing the first step in another modified embodiment of the method of forming a laminated structural member; and FIG. 12 is a cross sectional view showing the structural member formed from the laminate of FIG. 11.

DESCRIPTION OF THE PREFERRED EMBODIMENTS

FIG. 1 of the drawings shows a laminated structural member 11 of the type which can be manufactured in accordance with the teachings of this invention. This laminated structural member forms a cross member of a handle 13 intended to be installed on a stove or similar appliance. The laminated structural member 11 is mounted in plastic brackets 15 to form the handle. The brackets are clamped to a face panel 17 of a door of a stove or similar appliance by threaded fasteners 19 which engage the member 11 and the face panel 17.

This invention is concerned with the laminated structural member 11 which is incorporated as the cross member of the handle. Although the invention is shown and described as embodied in the cross member of a handle, the invention is not so limited in application and can be applied to almost any structural member.

The laminated structural member 11 is formed with an outer facing or sheet 23 of aluminum which is first attached along its edges to and then stretched over a core 25 of steel. In this embodiment of the invention, the laminated cross member 11 is of generally inverted U-shaped or channel construction. The outer or top facing 23, which is formed of a relatively thin aluminum sheet, is secured to the core by forming loops or curls 26 and 27 adjacent its edges 28 and 29 respectively around similar loops or curls 30 and 31 formed simultaneously adjacent the longitudinal edges 32 and 33 of the core 25. The core is formed of a steel which is heavier and stronger than the aluminum. The curls 26 and 27 of the outer facing fit around the core curls 30 and 31 and thereby fasten the outer facing to the core. The curls also provide smooth edges on the structural member which will not be injurious to a user.

FIG. 4 shows the first step in one method of this invention for forming the laminated structural member 11 having an outer metal facing 23 fastened to a heavier metal core 25. This first step involves positioning the sheet 23 on the core 25 and bending the edges 28 and 29 of the sheet 23 over the edges 32 and 33 of the core to simultaneously form loops or curls 26 and 27 in the sheet 23 and similar loops or curls 30 and 31 in the core. The laminate thus formed is then bent along axes located between and parallel to the looped edges one or more times into a shape having the concave side of the bend on the core side of the laminate. This creates a structural member of the type shown in FIG. 5 of the drawings.

The bending of the laminate in such a manner that the concave side of the bend is located on the core side of the laminate stretches the thinner outer aluminum facing 23 through a greater distance than the heavier steel core 25 is stretched. Since the outer facing 23 is fastened to the core 25 only at its looped edges 26 and 27, the aluminum is free to stretch relative to the core and the stretching causes it to tightly conform to the surface configuration of the core 25. The outer aluminum facing 23 may also slide or slip relative to the core 25 during bending due to the provision of looped or curled connections between the facing and the core. This feature prevents overstressing and consequential shearing of the aluminum. The radii of the loops or curls may be varied in accordance with the materials used for the core and outer facing and the physical size of the laminated structural member which is formed. Loops or curls of relatively small radii offer more resistance to sliding of the outer facing relative to the core than do loops or curls of larger radii and thus more tension in the final laminated member. Accordingly, the amount of slippage or sliding of the outer facing relative to the core and the tension in the final laminated structural member may be adjusted by varying the radii of the loops or curls.

Another method of fastening the outer metal facing 23 to the core 25 is shown in FIGS. 6, 7 and 8 of the drawings. In this second method of the invention, at least one side of the metal facing 23 is fastened to the core 25 by lancing the metal facing and core in spaced locations along one longitudinal edge thereof. "Lancing" is defined as the punching or stamping of tabs such as the tabs 37 through both the metal facing 23 and the core 25. The tabs are bent out of the plane of the laminate, preferably in the direction the laminate is to be bent in forming the structural member. Although the tabs shown in the drawings are rectangular, it should be understood that they could be formed in other shapes such as the triangular shapes shown in FIGS. 9 and 10.

The opposite edge of the laminate of FIGS. 6, 7 and 8 has an edge of the metal facing 23 looped or curled at 38 over a corresponding loop or curl 39 in the edge of the core 25, thereby forming a looped edge opposite the edge of the laminate having the tabs 37. It should be understood that instead of a looped edge, the facing 23 and the core 25 could be fastened to each other by lancing the laminate along opposite sides parallel to the axes of bending.

FIG. 8 shows the final step in forming a structural member 51 from the attached facing 23 and core 25. The attached facing and core are bent about two axes which are spaced apart and located between the lanced tabs 37 and the loops 38 and 39 and extend parallel to each other. The bending is accomplished so that the core 25 is located on the concave side of the completed structural member 51. The completed structural member is channel shaped with legs 53 and 55 of approximately equal length. It should be noted that the facing 23 has not only stretched around the core 25 but has also slid somewhat relative to the core as permitted by both the lanced and looped connections between the facing and the core. The aluminum facing portions 57 of the tabs 37 are pulled through the openings 59 in the core formed by the lances as the bends are made.

The amount of sliding of the aluminum facing 23 relative to the core 25 can be controlled by varying the shape of the lanced tabs. For example, lanced tabs in the shape of triangles 59 of the type shown in FIG. 9 in which the apex 61 of each triangle faces the direction of sliding can effectively limit the amount of sliding of the facing. The amount of sliding is limited by engagement of the walls of the triangular tab 59 formed in the facing with the opening formed in the core. Because of the triangular shape of the aluminum facing tab, increasing sliding will cause increased engagement between the tab and the core, thus severely limiting the amount of sliding of the facing relative to the core.

In contrast, the lanced tabs 63 of the type shown in FIG. 10 which are frusto-triangular have their bases 65 facing the direction of sliding of the facing 23 relative to the core 25. Therefore, as the facing slides relative to the core, the amount of resistance to sliding decreases since the walls of the tab will be located increasingly farther from the walls of the core as the facing slides.

Another modified form of laminated structural member 71 is shown in FIGS. 11 and 12 of the drawings. It consists of an aluminum facing 73 attached to a core 75 by loops 77 and 79 of the outer facing fitting over and around loops 81 and 83 of the core. In this example, the core 75 need not be heavier or of a different material than the facing, but it, of course, may be. The additional strength of the core is obtained by its forming prior to attachment to the facing. In this example, the core is formed as a corrugated or ribbed member having peaks 85 and 87 which contact the facing 73 and valleys 89, 91 and 93 located between the peaks. When the bends are made along axes parallel to the edges 77 and 79 of the facing, they are made at the peaks 85 and 87 of the core to form the channel shaped structural member 71 shown in FIG. 12. The laminated structural member 71 has a facing 73 which conceals all of the peaks and valleys of its core 75 and presents as aesthetically pleasing appearance in its final form. This laminated structural member also provides great strength because of its corrugated core which is not visible in the final construction.

If the laminate shown in FIGS. 6, 7 and 8 were to be used in a structural member forming a cross piece of a handle, the lanced portion having the tabs 37 would normally be positioned so that it would be at the back of the handle when the handle was attached to the stove or other appliance. In such a construction, the lanced edge of the laminate would form the smaller leg of the U-shaped member 13 and the looped edge would be located at the outer or longer end of the structural member.

An additional advantage of this invention is that the core 25 can be stamped, cut or otherwise formed to provide structural features that will be concealed by the outer facing 23. One such structural feature is a mounting tab 43 shown in FIGS. 2 and 3. The mounting tab is formed in the core before the outer facing is anchored to the core. A threaded fastener receiving opening 45 may be formed in the mounting tab 43. Other structural features which can be formed in the core 25 are cut-outs 47 to reduce the weight and material cost of the core and corrugations (not shown). The cut-outs 47 and corrugations will also be concealed by the outer facing 23.

It should be apparent that the outer facing 23 could be formed of a metal other than aluminum and the core could be constructed of some metal other than steel. The materials of the outer facing and core should be selected in accordance with the requirements of the laminated structural member. For example, if an attractive appearance is desired, the material of the outer facing could be formed of a material having a decorative finish or being capable of having such a finish applied thereto. If light weight is desired, then both the outer facing and the core could be formed of light weight metals. Other substitutions will be apparent to those who are skilled in this art.

I claim:

1. A method of forming a laminated structural member including the steps of:

superimposing a first sheet of metal on a second sheet of metal, attaching said first sheet of metal and said second sheet of metal to each other along areas spaced from and generally parallel to each other, and forming at least one bend in said attached sheets of metal between said attached areas with the concave side of said bend being located on the second side sheet of laminate in order to stretch said first sheet of metal through a greater distance than said second sheet of metal is stretched by the forming of the bend.

2. The method of claim 1 in which said first sheet of metal has appearance characteristics and/or finish accepting characteristics which are more desirable in the completed laminate than those of said second sheet of metal.

3. The method of claim 1 in which said first sheet of metal is attached to said second sheet of metal by forming overlapping loops in the sheets along opposite edges thereof.

4. The method of claim 1 in which said first sheet of metal is attached to said second sheet by lancing the sheets to form tabs which are bent out of the plane of the laminate.

5. The method of claim 1 in which cutouts and mounting tabs are formed in said second sheet of metal before it is attached to said first sheet.

6. The method of claim 1 in which said first sheet is aluminum and said second sheet is steel.

7. A laminated structural member including:
a strengthening core bent to a non-planar cross-section, the convex side of said bent core being covered by a metal sheet having appearance characteristics and/or finish accepting characteristics more desirable than those of said core,
said metal sheet covering being attached to said core only on opposite sides of said bend and being stretched into conformity with the convex surface of said core.

8. The laminated structural member of claim 7 in which said metal sheet is attached to said core by overlapping loops formed along opposite edges of the laminated structural member.

9. The structural laminate of claim 7 in which said metal sheet is attached to said core by lancing said sheet and said core to form tabs which are bent away from the laminate.

10. The laminated structural member of claim 7 in which mounting members are formed in said core.

11. The laminated structural member of claim 7 in which portions of said core are removed.

12. The laminated structural member of claim 7 in which said core is formed into a non-planar structural shape prior to bending.

13. The method of claim 1 in which the first and second sheets of metal are attached to each other in a manner which permits the first sheet to slide relative to the second sheet during the forming of the bend.

* * * * *